(12) United States Patent
Bhattathiri et al.

(10) Patent No.: US 10,901,752 B2
(45) Date of Patent: Jan. 26, 2021

(54) MESSAGE BASED DISCOVERY AND MANAGEMENT OF APPLICATIONS

(71) Applicant: VMWARE, INC., Palo Alto, CA (US)

(72) Inventors: Kara Madhavan Bhattathiri, Bangalore (IN); Shree Harsha Shedigumme, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 63 days.

(21) Appl. No.: 16/127,259

(22) Filed: Sep. 11, 2018

(65) Prior Publication Data

US 2020/0026528 A1 Jan. 23, 2020

(30) Foreign Application Priority Data

Jul. 20, 2018 (IN) .............................. 201841027137

(51) Int. Cl.
*G06F 9/445* (2018.01)
*G06F 8/61* (2018.01)
*H04L 12/58* (2006.01)
*G06F 40/295* (2020.01)

(52) U.S. Cl.
CPC ............ *G06F 9/44505* (2013.01); *G06F 8/61* (2013.01); *G06F 40/295* (2020.01); *H04L 51/18* (2013.01)

(58) Field of Classification Search
None
See application file for complete search history.

(56) References Cited

U.S. PATENT DOCUMENTS

| | | | |
|---|---|---|---|
| 8,146,074 B2 | 3/2012 | Ito | |
| 8,191,061 B2 | 5/2012 | Jun | |
| 8,396,759 B2 | 3/2013 | Mehta | |
| 9,600,258 B2 | 3/2017 | Ramachandran | |
| 9,798,737 B2 | 10/2017 | Palmer | |
| 9,887,941 B1 * | 2/2018 | Guarraci | H04L 51/18 |
| 2004/0043758 A1 | 3/2004 | Sorvari | |
| 2006/0212286 A1 * | 9/2006 | Pearson | G06Q 10/107 704/9 |
| 2011/0067023 A1 | 3/2011 | Chiyo | |
| 2011/0208822 A1 | 8/2011 | Rathod | |
| 2011/0320307 A1 | 12/2011 | Mehta | |
| 2012/0272231 A1 | 10/2012 | Kwon | |
| 2013/0191397 A1 | 7/2013 | Avadhanam | |
| 2013/0275429 A1 | 10/2013 | York | |
| 2013/0326499 A1 | 12/2013 | Mowatt | |
| 2014/0157387 A1 | 6/2014 | Lee | |
| 2014/0215367 A1 | 7/2014 | Kim | |
| 2015/0007157 A1 | 1/2015 | Park | |
| 2015/0081440 A1 | 3/2015 | Blemaster | |
| 2015/0161134 A1 | 6/2015 | Balani | |

(Continued)

*Primary Examiner* — Fahmida Rahman
(74) *Attorney, Agent, or Firm* — Clayton, McKay & Bailey, PC

(57) ABSTRACT

A system can receive a message intended to be received by a device. The system can implement an application discovery service to identify keywords in the message. The keywords can be used to determine what applications are required to access content in the message. The system can determine that a required application is not available on the device from a list of managed applications. The system can cause the required application to be made available on the device before, at the same, or after the device receives the message.

20 Claims, 6 Drawing Sheets

(56) References Cited

U.S. PATENT DOCUMENTS

| | | |
|---|---|---|
| 2015/0163186 A1* | 6/2015 | Tian .................. G06F 9/445 709/206 |
| 2015/0350123 A1 | 12/2015 | Park |
| 2016/0171511 A1 | 6/2016 | Goel |
| 2016/0216955 A1 | 7/2016 | Kwon |
| 2017/0315826 A1 | 11/2017 | Samal |
| 2018/0129703 A1 | 5/2018 | Eichberger |

* cited by examiner

MESSAGE BASED DISCOVERY AND MANAGEMENT OF APPLICATIONS

RELATED APPLICATIONS

Benefit is claimed under 35 U.S.C. 119(a)-(d) to Foreign Application Serial No. 201841027137 filed in India entitled "MESSAGE BASED DISCOVERY AND MANAGEMENT OF APPLICATIONS", on Jul. 20, 2018, by VMware, Inc., which is herein incorporated in its entirety by reference for all purposes.

BACKGROUND

Enterprises increasingly rely on Mobile Device Management ("MDM") or Enterprise Mobility Management ("EMM") providers to help manage devices for employees. These device-management systems allow an enterprise to exercise varying levels of control over devices, even when those devices are employee-owned. Devices enrolled in a device-management system may have installed system-mandated management software, productivity applications, communication applications, and other software.

However, certain communications such as emails, text messages, or internal chat application messages may include content that requires an application that is not currently available on a device receiving the email or message. Regardless of a reason for why a required application is not available on a device, a user of the device must expend time to have the application installed, configured, or otherwise setup after the email is received. This can sidetrack the user from enterprise duties, such as taking actions in response to the email, decreasing work output for the enterprise.

To ensure users have the right applications, many enterprises currently implement solutions for application management. This can include automatically pushing all enterprise-developed applications or enterprise-approved third-party applications to employee-owned devices when they are enrolled with an EMM. Similarly, enterprise-owned devices can be loaded with applications when the devices are configured for employee use according to EMM requirements. In some situations, a user manually installs all applications assigned by an enterprise to the user device.

However, the above solutions can be costly, time consuming, inefficient, and cumbersome. For example, an all-at-once push of all enterprise applications to devices will require significant computing resources from servers pushing the applications. This may result in wasted cost for licenses for applications that are never used by large numbers of users. In addition, this process can drain storage and computing capacity on user devices for applications that are never used. The manual installation by a user via catalog consumes time that could be utilized by the user to perform productivity or revenue generating duties required of the user's roll in an enterprise. Further, firmware updates may require significant planning and require certain devices or applications be unavailable for periods of time.

In addition to these issues, during a normal course of business for a user employed by an enterprise, the user may receive messages and emails that require unavailable applications on a frequent and unpredictable basis. None of the above solutions effectively address a scenario where an email or other message specifies an application that is not available (e.g., assigned, permitted to be used, installed, etc.) on the user's device.

As a result, a need exists for a system and method that enables one or all of assignment, installation, and granting of permission for usage of an application on a device in anticipation of specific actions where the application is required.

SUMMARY

Examples described herein include systems and methods for discovering a need for, and managing an availability of, applications based on message content. In one example, an application discovery service can analyze an application configuration file and generate a regex based on the content of the application configuration file. The regex can be a sequence of characters that defines a search pattern. The application configuration file can include information that identifies applications that are managed by a management server and selectively available on devices enrolled with the management server. For each application, the application configuration file can include a set of keywords that is associated with the particular application. The application discovery service can generate the regex that includes a search pattern composed of search strings derived from the keyword and identifying information for each of the applications included in the application configuration file. Other techniques can also be used to analyze email messages and determine which applications should be installed.

The application configuration file can be created by and obtained from the management server, or in another example, provided by an administrator that created the file. In another example, the application discovery service can receive multiple single application-specific configuration files which it compiles into one application configuration file. In another example, the application discovery service can update the application configuration file each time a new application-specific configuration file is received. The regex can be updated with each update of the application configuration file.

The application discovery service can apply a regex to a copy of a message that it receives from a gateway service. Application of the regex according to one example can include a string searching algorithm utilizing a search pattern defined in the regex for a "find" or an input validation operation. In one example, the message is an email, and the copy is an Extensible Markup Language ("XML") form of the email. By applying the regex to the copy, keywords included in the copy can be identified to the application discovery service. The application discovery service can reference the identified keywords with the application configuration file and determine which of the applications in the application configuration file are required to access all of the content in the message corresponding to the copy. In other examples, the email can be delivered to the device, and installation of the needed applications can occur concurrent with or after delivery of the email message.

The application discovery service can determine an identity of the device from the copy and communicate the device ID to the management server. In response, the management server can provide a list of applications that are available on the device. In one example, this can be based on a group to which a device ID belongs. For example, a developer group can have different available applications than a sales group. An application may be available if it is installed and can operate on the device to access corresponding message content. Based on a comparison of the required and available applications, the application discovery service can: (A) identify applications needed by the device to access all of the message content; and (B) generate trigger information.

The trigger information, which identifies the needed application, can be transmitted to the management server and cause the management server to generate an application instruction. The application instruction can include commands, content, or a combination of these elements. The application instruction can cause needed applications to be installed, setup, initialized, configured, or have permissions granted to make the application available for accessing corresponding content in the message. The device can implement the application instruction, or the management server can implement the application instruction on the device. The implementation process can depend on a status of the device with respect to the management server. In one example, user authorization for a needed application to be made available on the device may be required.

The gateway service can deliver the message to the device. With all required applications available on the device, all of the message content can be accessed upon message receipt. Alternatively, the message may be delivered to the device prior to installation of the required application being completed, but installation can occur in the background so that it is available when a user opens the message.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples described herein include systems and methods for discovering a need for and managing an availability of applications based on message content. In one example, an application discovery service implemented on a server can receive a copy of a message intended to be delivered to a device that is enrolled with a management server. While the application discovery service analyzes the copy, delivery of the message to the device can proceed or be delayed by a gateway service. Based on an analysis of content in the copy, the application discovery service can identify all application required to access (open, view, run, etc.) all of the content in the message. The application discovery service can communicate with the management server to determine which of the required applications are not available on the device. Further, the application discovery service can cause the management server to cause these needed applications to be made available on the device before, at the same time, or after the device receives the message.

Figure 1:
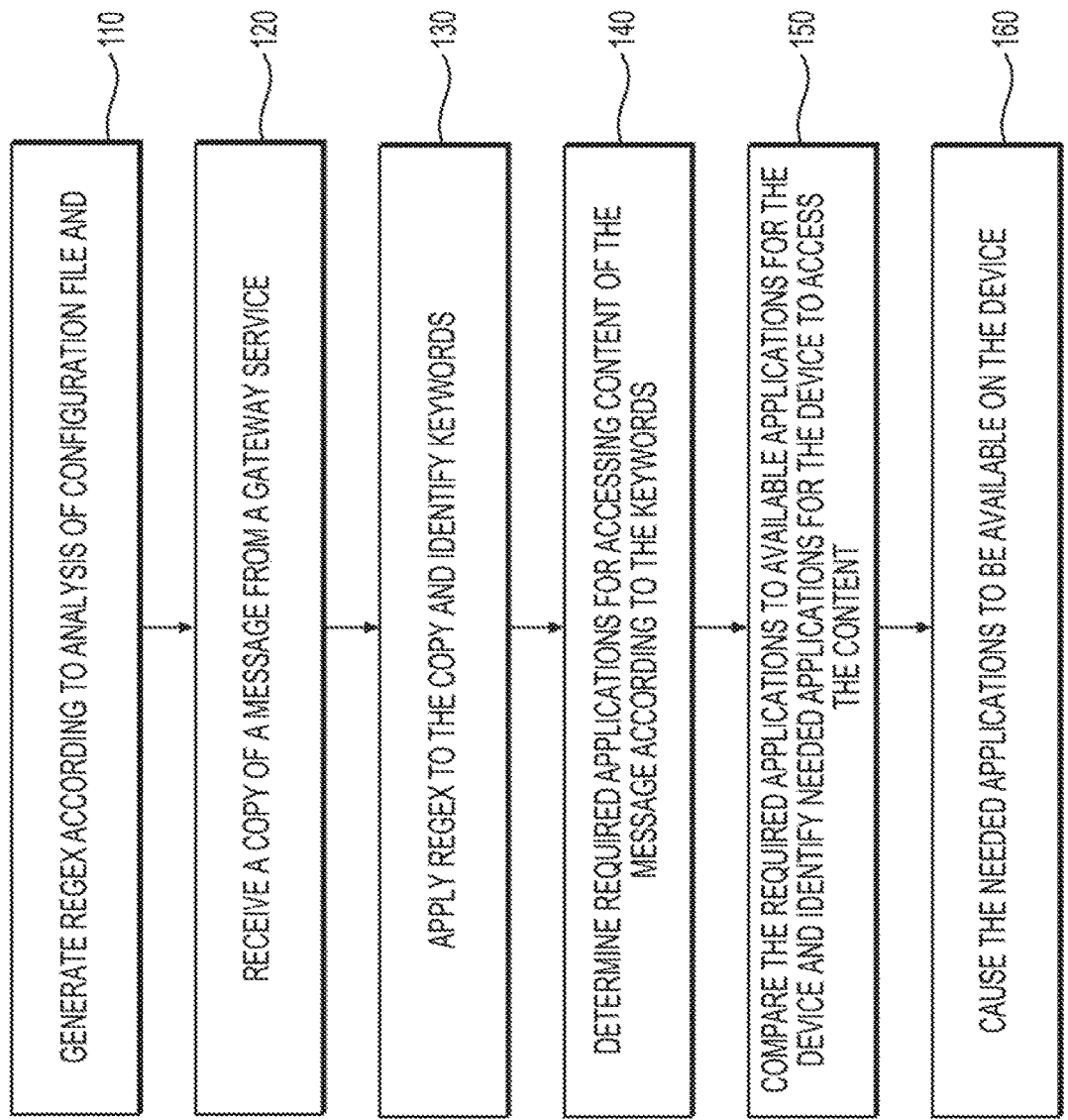
FIG. 1 is a flowchart of an exemplary method for discovering and managing the availability of applications needed by a device to access message content based on the message content.
Figure 2:
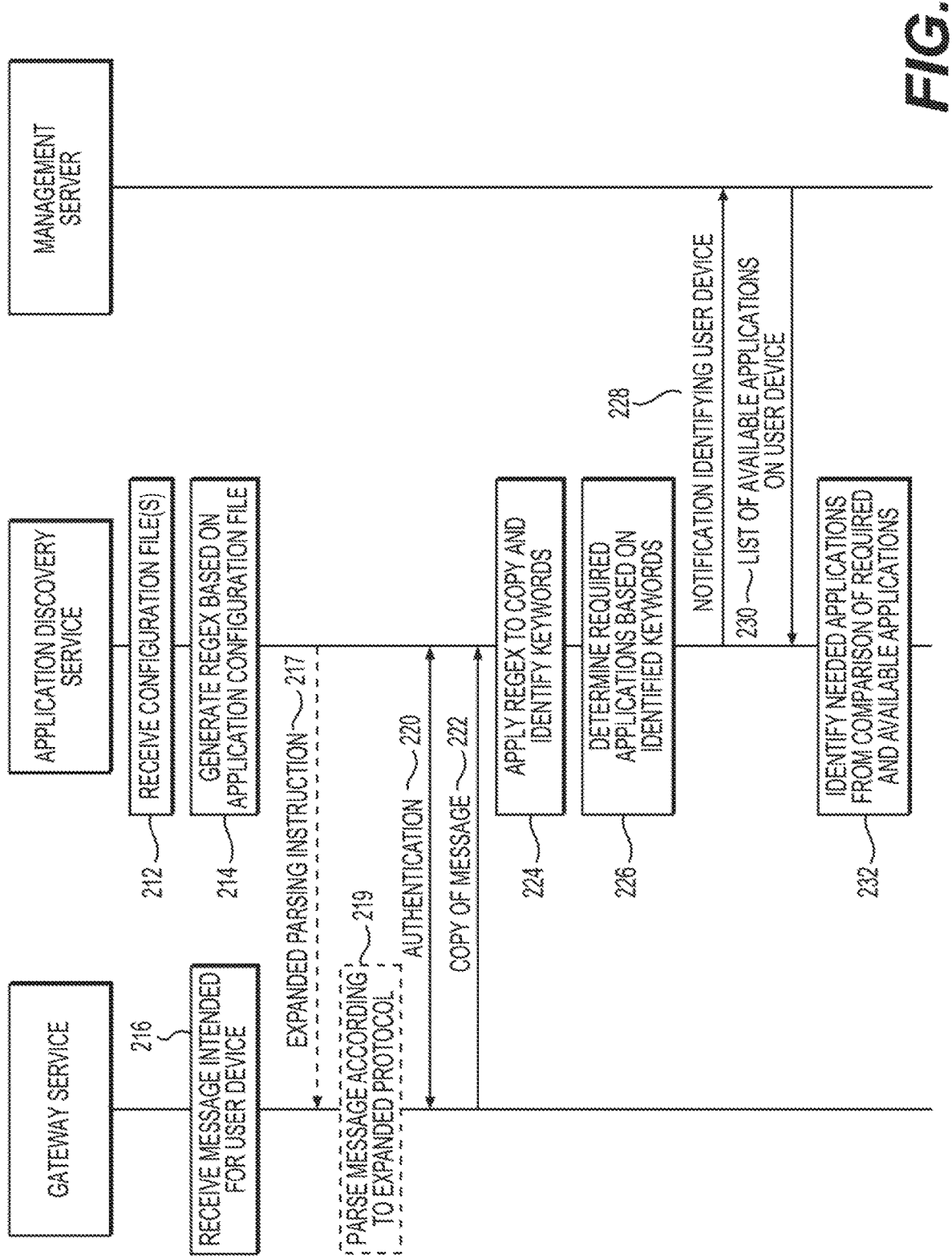
FIG. 2 is a sequence diagram of an exemplary method for identifying applications needed to access message content.
Figure 3:
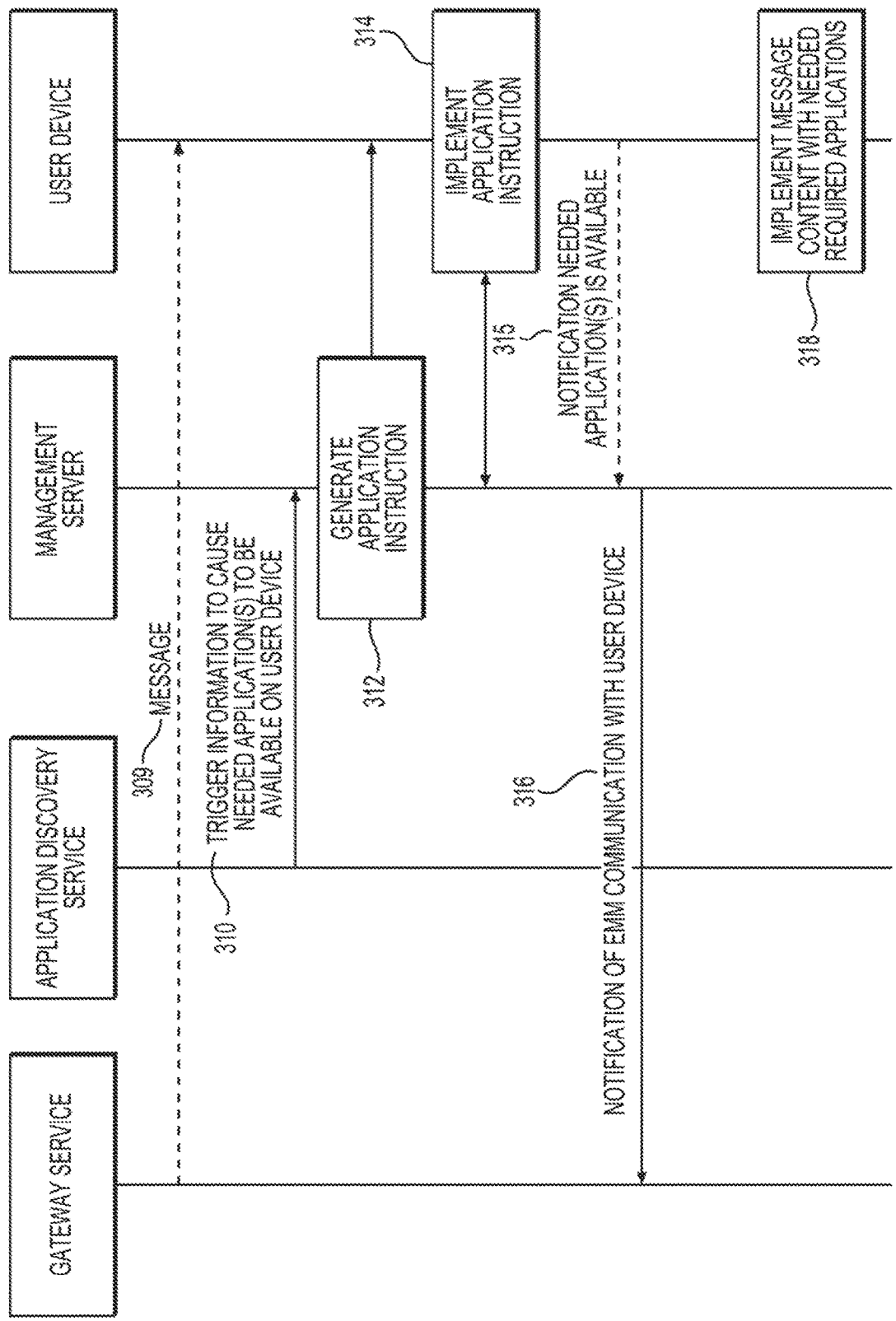
FIG. 3 is a sequence diagram of an exemplary method for making needed applications available to a device.
Figure 4:
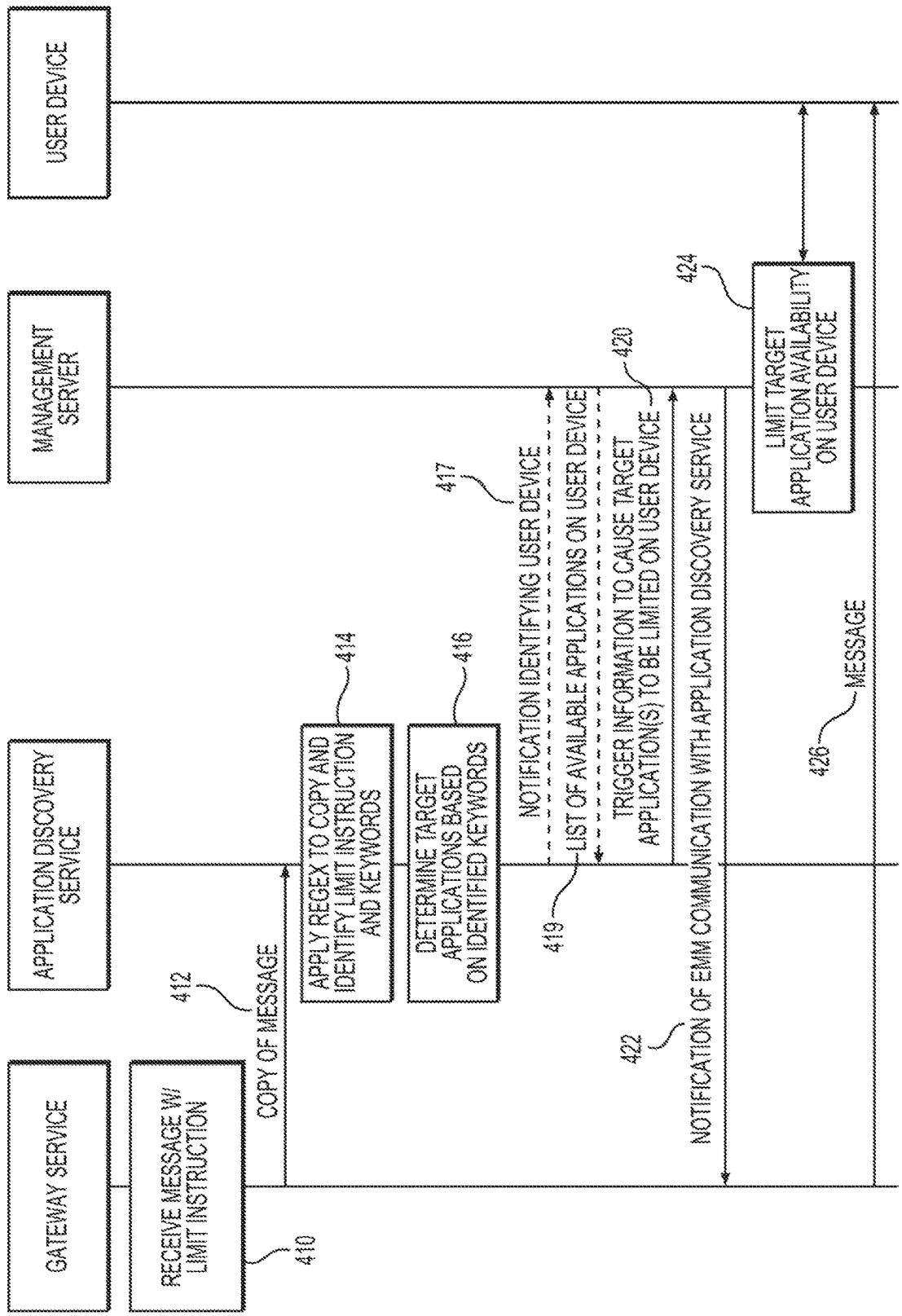
FIG. 4 is a sequence diagram of an exemplary method for limiting application availability on a device based on message content.
Figure 5:
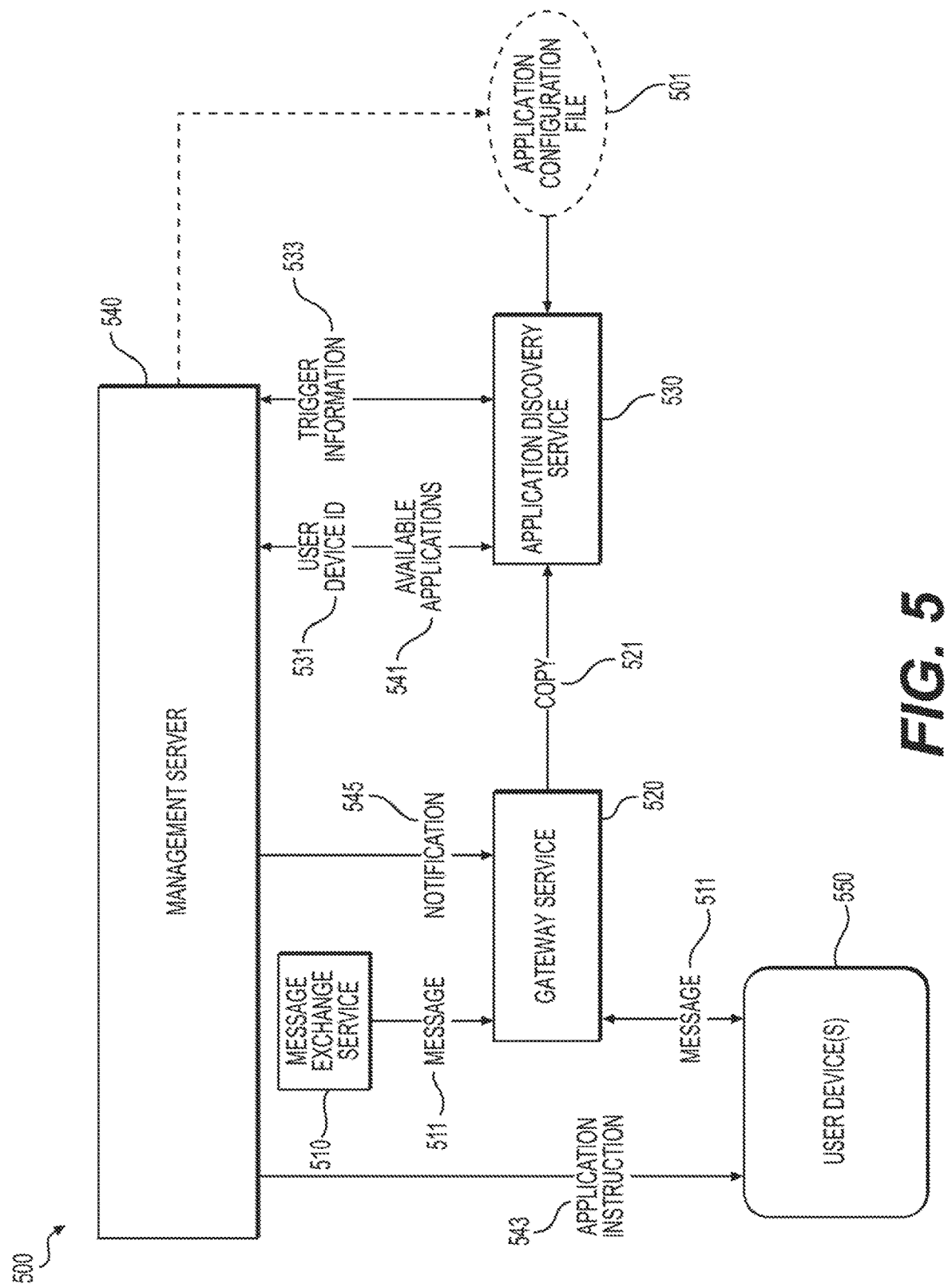
FIG. 5 is an exemplary illustration of system components for discovering and managing the availability of applications needed by a device to access message content based on the message.
Figure 6:
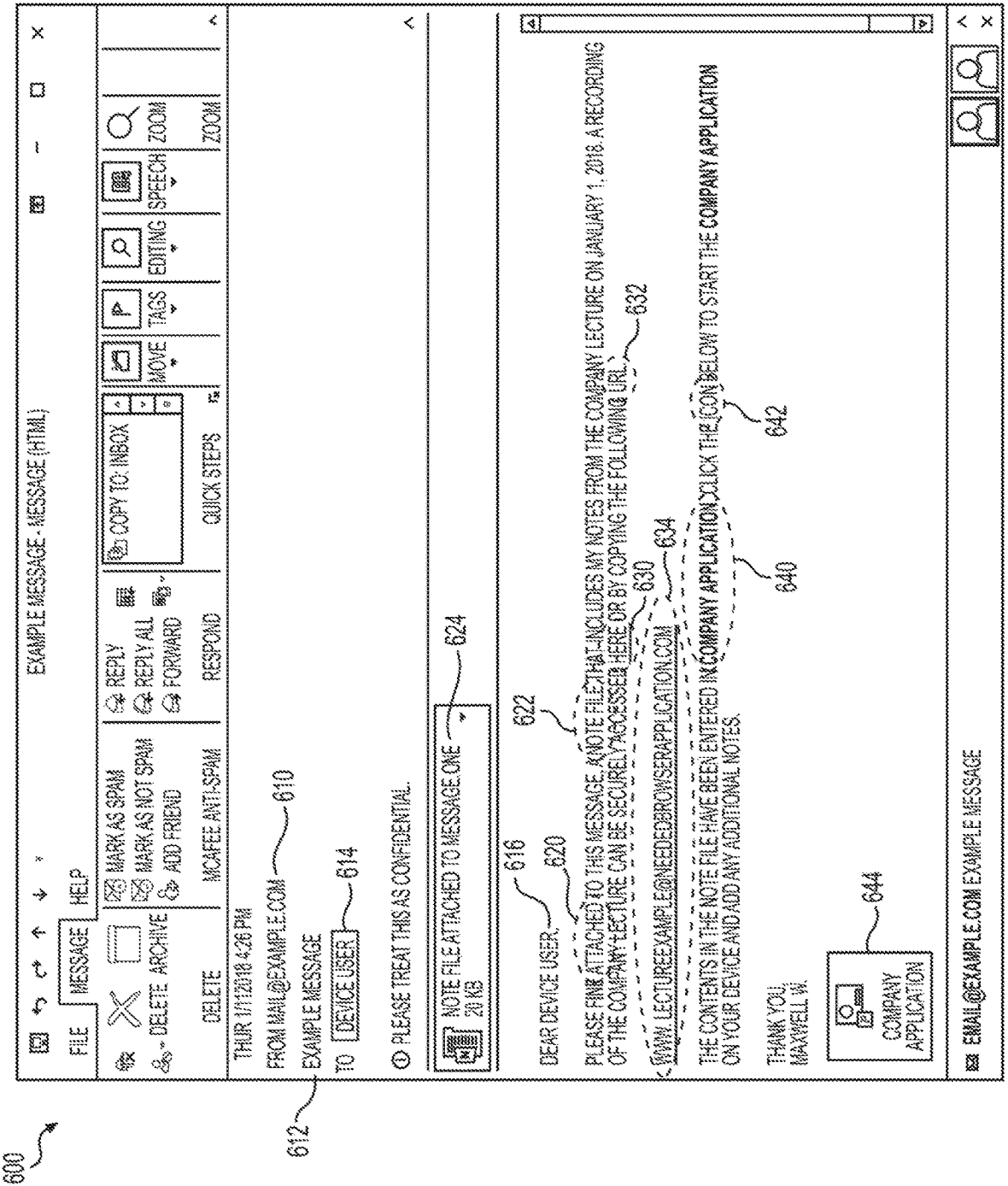
FIG. 6 is an exemplary illustration of a message that can be received by a device that may need different applications to access all content of the message.

FIG. 1 provides a flowchart of an example method for discovering and managing the availability of applications needed by a device to access message content based on the message content. FIG. 2 provides a more detailed sequence diagram for a portion of the method of FIG. 1 that includes identifying applications needed to access message content. FIG. 3 provides a more detailed sequence diagram for a portion of the method of FIG. 1 that includes making needed applications available to a device. FIG. 4 illustrates an exemplary sequence for a method of limiting application availability on a device based on content in a message. More specifically, FIG. 4 relates to a method of sending messages that include content that may be recognized through an application of a regex to require certain applications be uninstalled on a device or group of devices that will receive the message. FIG. 5 provides an illustration of exemplary system components for performing the methods of FIGS. 1-4. FIG. 6 is an exemplary illustration of a message that may be copied. The regex can be applied to the copy to determine what applications are needed by a device set to receive the message, and these applications can be made available on the device before, at the time, or after the device receives the message.

Turning to the flowchart of FIG. 1, stage 110 can include generating a regex according to an analysis of an application configuration file. A regex can be a sequence of characters derived from the application configuration file that defines a search pattern. Application of the regex according to one example of the present disclosure, includes a string searching algorithm utilizing a search pattern defined in the regex for a "find" or an input validation operation.

The regex can be generated based on a set of applications that are selectively available to management server-enrolled devices that can include: (A) various enterprise-owned devices that are controlled or otherwise uniquely configured to cooperate with a management server; and (B) devices that are supervised or managed by the management server. Search strings within the regex can incorporate a list of the applications and keywords respectively related to the applications. The list of applications and keywords can be included in a structured file (an application configuration file) that is provided to the application discovery service. The application configuration file can be generated by an administrator or automatically by, for example, a management server configured to access and recognize information related to the applications is manages.

At stage 120, the method can include an application discovery service receiving a copy of a message from a gateway service. In one example, the copy can be an exact copy of the message. In another example, where the message is in the form of an email and the copy consists of an XML form of the email.

At stage 130, the method can include the application discovery service applying the regex to the copy which results in the identification of keywords. Application of the regex can identify keywords or content corresponding to application names or different operating system IDs for the applications. In addition, certain content, such as attachments, links, and website addresses can be recognized by the regex as containing application identifying information. Accordingly, the regex can parse through all the information encapsulated by the copy of the message. This may include metadata or, depending on the form of the message embodied by the copy, information that is in a different format from corresponding information in the message as it would be delivered.

At stage 140, the application discovery service can determine what applications are required to access the content in the message based on the identified keywords. In particular, the keywords identified in stage 130 can be compared to keywords in the application configuration file to determine what applications the keywords correspond to. A list of applications required to access all of the content in the message can be generated from the applications determined to correspond to the identified keywords.

In one example, the application configuration file can include a unique set of keywords for each included application. In another example, stage 140 can include a process for determining whether an identified keyword corresponds to two or more applications that each include a set of keywords that includes the identified keyword. In one example, the method can include determining one application takes precedence over another if no other keywords are identified in the copy. In another example, the identified keyword may be considered in combination with other identified keywords to determine a corresponding application from the application configuration file.

At stage 150, the application discovery service can compare the list of required applications to a list of applications available to the device associated with the destination for the message. Based on the comparison, applications needed by the device to access message content can be identified. A destination of the message can be associated with a particular user device enrolled with the management server. An ID for the user device can be used to obtain, from the management server for example, the list of applications that are available on the user device. An available application may include an application that is installed and operational on the particular user device. In particular, an available application may be operational on the user device, at least with respect to any corresponding content in the message, without further setup, feature initialization, granting of permissions, updates, or installation.

The management server can keep a list of the available applications based on communications from a management agent that runs on the user device, in an example. The management agent can be part of the operating system or installed as an application as part of device enrollment with the EMM. The management agent can provide device information to the management server. The management agent can also perform management functions at the user device as instructed by the management server, including causing the user device to download and install needed applications. The management agent can also enforce compliance rules, such as ensuring that particular applications remain available and unmodified at the user device. managed by the management server, and is operational on the user device, at least with respect to any corresponding content in the message, without further setup, feature initialization, granting of permissions, updates, or installation.

At stage 160, the application discovery service can cause the needed applications to be made available to the device prior to the device receiving the message from the gateway service. In one example, trigger information including a list of the needed application can be provided by the application discovery service to the management server. The management server can transmit an application instruction to the user device.

The application instruction can cause the management agent to install the needed application on the user device. The user device can install the needed application automatically in one example. In another example, the management agent can prompt the user to accept installation prior to installing the needed application. In another example, the application instruction can include a series of commands that cause the user device to unlock features or updates for previously installed applications. In yet another example, the application instruction can include a combination of content and commands that when collectively implemented, converts an installed application on the device that was not managed by the management server, to a managed version of the application.

The message can be delivered to the device from the gateway service before, after, or during any one of stages 120 to 160. In one example, reception of the message can be conditioned on all required applications being available on the device. In another example, the all required applications can be made available as the message is delivered or after reception.

FIG. 2 provides an example sequence diagram for identifying needed applications, such as described in FIG. 1. At stage 212, an application discovery service can receive one or more application-specific configuration files. In one example, the application configuration file can be provided to the application discovery service by a management server, which can include another service operating under the control of the management server or an administrator for an enterprise. The application configuration file can include a combination of the content from several application-specific configuration files. The application-specific configuration files can follow one or more templates. Table 1 includes an example of an application configuration file template.

TABLE 1

| Application Configuration File Template |   |
| --- | --- |
| Line 1: | [Application Name]: |
| Line 2: |    [Device Type #1]: |
| Line 3: |       id: [Application ID for Operating System/Device Type #1] |
| Line 4: |    [Device Type #2]: |
| Line 5: |       id: [Application ID for Operating System/Device Type #2] |
| Line 6: |    keywords: |
| Line 7: |     - [keyword #1] |
| Line 8: |     - [keyword #2] |
| Line 9: |     - [keyword #3] |
| Line 10: |     - [keyword #4] |

An example template can provide: a name of an application; an operating system specific ID for an application for each operating system for which a version of the application exists; and a list of keywords. For example, as shown in the template of Table 1, line 1 includes a field for an application name, lines 3 and 5 include fields for application IDs for different operating systems, and lines 7-10 include fields for keywords. Applications may have one or more keywords, and the number of keywords for a particular application can differ from the number of keywords shown with Tables 1 and 2.

Table 2 includes an example of an application configuration file.

TABLE 2

Application Configuration File

| | |
|---|---|
| Line 1: | ExpenseTracker: |
| Line 2: | android: |
| Line 3: | id: com.coupa.android.expensetrackermobile |
| Line 4: | ios: |
| Line 5: | id: com.expensetracker.push |
| Line 6: | keywords: |
| Line 7: | - expensetracker |
| Line 8: | - expense |
| Line 9: | - travel |
| Line 10: | - reimburse |
| Line 11: | EnterpriseBrowserX: |
| Line 12: | android: |
| Line 13: | id: com.coupa.android.enterprisebrowserxmobile |
| Line 14: | ios: |
| Line 15: | id: com.enterprisebrowerx.push |
| Line 16: | keywords: |
| Line 17: | - enterprise |
| Line 18: | - browserx |
| Line 19: | - www.ebrowx.com |
| Line 20: | - xlogin |

As shown in Table 2, line 1 includes the name of a first application ("ExpenseTracker"), and line 11 includes a name of a second application ("EnterpriseBrowserX"). The information in lines 2-10 is associated with the first application, and the information in lines 12-20 is associated with the second application. The information in lines 2-10 and in lines 12-20 follow the template provided in Table 1. Other template configurations can also be implemented through the application discovery service. Such other template configurations may include additional categories of information that can be used to identify applications required to access content in a message. For example, a message or media type, or an identification of a cellular or internet service, or a messaging application through which the message is transmitted and received.

In another example, the application discovery service can receive each application-specific configuration file and compile the files into one application configuration file. In yet another example, the application discovery service can receive a new application or application-specific configuration file for new applications or groups of applications managed by the management server, and subsequently update an existing application configuration file.

The application configuration file can also include information related to limiting application availability, as discussed in more detail with reference to FIG. 4. The application limiting information can be: (A) included in an application configuration file provided to the application discovery service; (B) generated by the application discovery service; (C) generated through the application discovery service by an administrator; (D) part of an application-specific configuration file that is compiled by the application discovery service; or (E) part of an application-specific configuration file that is implemented in the application configuration file by the application discovery service as part of an update.

At stage 214, the application discovery service can generate a regex based on the application configuration file. In particular, the application discovery service can parse through the application configuration file to create search strings that incorporate application names, IDs, and keywords. The search strings can be compiled into a search pattern that is applied to a copy of a message received by the application discovery service from a gateway service. The regex may be updated by the application discovery service when new application-specific configuration files are received or an application configuration file is otherwise updated.

Stage 216 of the method can include a gateway service receiving a message for delivery to a destination associated with a user device enrolled with the management server. A user device may include any computing device such as a tablet, a laptop, a mobile device, phone, or any other processor-enabled device. The gateway service may be implemented on a server separate from the servers on which the management server and the application discovery service are implemented.

At stage 220, the gateway service and the application discovery service can perform an authentication process when a message is received by the gateway service. In one example, the application discovery service and the gateway service will authenticate via a certificate authentication. In response to completion of the authentication process, the gateway service can transmit a copy of the message to the application discovery service at stage 222. In one example, the message is an email and the copy of the message is XML version of the email.

In one example, the method illustrated with the sequence of FIG. 2 can include stage 217 and stage 219 being performed prior to stage 222 or stage 220. At stage 217, the application discovery service can provide the gateway service with an instruction to expand a gateway parsing protocol. The gateway service may implement a standard protocol for parsing a message, such as an email, and taking actions based on a set of rules as a result of implementing the parsing protocol. For example, upon determination that the message includes attachments, the gateway service can encrypt the attachments. In another example, as a result of the implementing a parsing protocol, the gateway service can determine a message includes a particular string and replace a Uniform Resource Locator ("URL") scheme of links so that the links only open in a particular management server managed browser.

In one example, the expanded parsing protocol instruction can include a group of keywords from the application configuration file. At stage 219, the gateway service can implement the expanded parsing protocol and identify keywords in the message as a preliminary filter so as to limit the number of message copies that the application discovery service has to process. In one example, the expanded parsing instruction can specify that a copy of every message where a URL scheme is to be replaced be transmitted to the application discovery service.

At stage 224, the application discovery service can apply the regex to the copy and identify keywords. Application of the search pattern embodied by the regex can result in the identification of keywords or application names that are included in the copy of the message.

At stage 226, applications required to access all of the content in the message can be determined based on the identified keywords. In particular, the application discovery service can compare the identified keywords to the application configuration file and obtain the application IDs corresponding to applications having those keywords.

At stage 228, the application discovery service can communicate to e management server, the identity of the user device associated with the destination of the message received by the gateway service. The application discovery service can derive the identity of the user device from the message copy or request and receive the identity from the gateway service.

At stage 230, the management server can access information regrading the identified user device and obtain a list of applications that are available for the identified user device. An available application is an application that is installed and operational on the user device. In categorizing applications as available, example systems can also take into account additional steps that must be performed to operate the application. For example, an application may not be considered available if it requires one or more of: application assignment; application download, installation, initialization, or setup; permissions be granted to the user by the management server or an administrator; or updates be installed and/or permissions be granted for update installation. These factors for determining availability can differ between examples.

In stage 232, the method can include the application discovery service comparing the list of available applications to the list of required applications, and identifying any applications needed by the user device to access all of the content in the message.

FIG. 3 provides an example sequence diagram encompassing the stages directed toward causing needed applications to be made available to a user device described in FIG. 1 and showing interactions between various system components. At stage 309, the gateway service can release, and the user device can receive, the message. Stage 309 is illustrated in FIG. 3 as optional because it can be performed any time after the copy is generated for transmission at stage 222, and before stage 318.

At stage 310, the application discovery service can create and transmit to the management server, trigger information to cause the management server to cause one or more needed applications to become available to the user device. The trigger information can include an instruction or a request that identifies the needed applications and the user device on which the needed applications are to become available. In addition, the trigger information can specify a time at which availability is needed so that the needed applications become available on the user device prior to receiving the message. In another example, the trigger information can specify a time period for application availability on the user device. After the time period expires, the management server can cause availability of a once-needed application to become limited.

At stage 312, the management server can generate and transmit an application instruction to the user device. The application instruction can include application content that is pushed to the user device and caused to be installed. In another example, the application instruction can include a set of commands to be performed by an operating system on the user device, such that an application already installed on the user device is either initiated or setup.

In one example, content of the application instruction can be generated by the management server according to a status of the user device as a device that is enrolled with the management server. The status of the user device refers to whether the user device is enrolled as an enterprise-owned device that may be controlled or otherwise uniquely configured to cooperate with the management server versus a supervised (for iOS) or managed (with Original Equipment Manufacturer ("OEM") Application Program Interfaces ("APIs") for Android) device. As a result, the application instruction can specify a set of commands that cause the user device to install the needed applications automatically. In another example, the user device can be a user-owned device or unsupervised/not managed, and the application instruction can: (A) grant permission for the device to access, download, and install the needed application; and (B) generate a user prompt for the user to authorize application installation on the user-owned device. Granting permission may include issuing a license for the needed application to the device which permits download and/or installation.

In stage 314, the application instruction can be implemented by the user device. As a result, the needed applications can be installed, updated, initialized, and/or setup automatically or via user prompt and authorization. Implementation can include the user device communicating with the management server to receive data including the application, updates, licenses, configuration files, and/or permissions for installing/using the needed application.

At stage 316, the management server can notify the gateway service of the communication between the user device and the management server. In one example, the management server may condition sending the notification to the gateway service on receiving an indication from the user device that the needed applications are now available. This optional stage may be selectively performed by the management server upon a recognition by the management server that an implementation of at least one needed application in not automatic and requires a user authorization.

As noted previously, stage 309 can be performed at any time before, during, or after stages 310 to 316. In one example, the application discovery service or the gateway service can determine that a message has been marked as urgent or that a majority of its content can be accessed by the device. As a result of this analysis, the message can be delivered as soon as the copy is generated for stage 222.

In another example, the application discovery service can determine message delivery should be delayed based on an amount of content or type of content that requires a needed application for access. This can occur based on a recognition that delivery to the device without the needed applications would be of little value, and potentially cause a user to waste time. Accordingly, the gateway service can transmit the message to the user device in response to receiving the notification from the management server in stage 316. Thus, message transmission can occur after the application instruction is fully implemented and all the needed application have become available on the user device.

At stage 318, regardless of when stage 309 was performed, all message content can be accessed through implementation of the required applications which are available on the user device Implementation of the methods described in FIGS. 1-3 obviates the need for an administrative action of application assignment, and a user action of downloading and/or installing an application. These actions are often required on an ad-hoc basis as a result of the unpredictable, but not uncommon, occurrence of user receiving a message that an enterprise enrolled device is unable to fully access because it does not include all required applications. According to an aspect of the present disclosure, assignment, installation, setup, initialization, download, and or update of an application required to access content in a received message can occur automatically, or through a simple user authorization process, before, at the same time, or after the message is received, and without action on the part of at least an administrator.

In one example, a user will no longer have to manually install an application or request and receive permission from an administrator for an installation to occur. According to an aspect of the present disclosure, application management for the device and triggers for installing applications are initiated and managed based on the content of a message having a destination associated with the user device.

In one example, the application discovery service discovers and causes an application to be installed on a device without any, or at most minimal, user action. In another example, the management server, based on the trigger information provided by the application discovery service, recognizes that user authorization is required to make a needed application available on the user device because the user device is not an enterprise-owned device. As result, the management server can obtain user authorization through a simple process that does not required the user to download, configure, or otherwise setup any part of a needed application. In turn, the management server can make the needed application available on the user device, prior to message delivery. The methods and systems according the present disclosure provide on demand application management that does not require constant action or intervention by users or administrators within an enterprise. Accordingly, these individuals are not required to spend time on administrative tasks that can reduce productivity.

The examples of FIGS. 1-3 relate to making applications available on a user device on an as needed basis. This makes it unnecessary for an enterprise to send all assigned applications to a user device when the user device is enrolled with a management server. As the management server does not need to queue all applications for the user device at the time of enrollment, computing resources are conserved. This also avoids having to provide groups of enrolled devices with a package of applications, where each application requires a costly license for each device, but many of the applications may never be used by some or all of the devices. As a result, the methods and systems according to the present disclosure can reduce computing resources used for application management, and avoids wasteful expenses associated with unused applications.

FIG. 4 provides an example sequence diagram encompassing stages directed towards limiting availability of target applications on one or more user devices based on message content. At stage 410, the gateway service can receive a message that is intended for a user device or a group of devices and includes a limit instruction. The limit instruction can include a particular string of characters provided in an identifiable field of the message, for example, a subject line of the message. The limit instruction can also include a name of one or more applications to be limited, or keywords associated with the applications. In another example, the limit instruction can be provided in the identifiable field, and the identity of, or keywords associated with, one or more applications, may be included in a body of the message.

At stage 412, the gateway service can create a copy of the message, for example an XML form of an email, and transmit the copy to the application discovery service. The copy need not be a complete version of the email, in an example.

In stage 414, the method can include the application discovery service applying the regex to the copy and identifying the limit instruction and keywords. Application of the regex can result in the identification of the limit instruction directly, or through identification of particular keywords that the application discovery service recognizes as corresponding to a limit instruction.

At stage 416, the application discovery service can process the identified keywords and determine the identity of target applications. A target application is an application that if available on the user device, is to have its availability limited according to the message received at stage 410.

At stage 420, the application discovery service can generate and transmit to the management server, trigger information to cause the management server to limit the availability of the target applications on the user device. The trigger information can include an instruction or a request that identifies the target applications and the user device on which availability of the target application is to be limited. In one example, limiting application availability can correspond to the application being completely uninstalled on the user device. In another example, limitations on application availability can correspond to restricting the user device from implementing certain application features that were previously available. The trigger information can specify a time at which availability is to be limited, as well as a time period for limiting target application availability.

The application discovery service can create and transmit the trigger information immediately upon determining the identify of the target applications. In another example, the sequence illustrated in FIG. 4 can optionally include stages 417 and 419 being performed prior to stage 420. At stage 417, the application discovery service can notify the management server of the identity of each of the one or more user devices associated with the one or more destinations included in the message received at stage 410. In response, the management server can access information about each device and transmit a list of available applications for each of the user devices. The application discovery service can compare the lists of available applications to a list of identified target applications and generate trigger information with respect to only those user devices on which one or more target applications are available.

At stage 422, the management server can notify the gateway service of the communication with the application discovery service including the trigger information. The notification can also include an instruction to release the message to the one or more user devices, or to continue to delay delivery until further notification which may depend from the completion of stage 424.

At stage 424, the management server can cause the availability of the target applications to be limited on the one or more user devices. In one example, the management server can transmit an application instruction including a series of the commands that are implemented by each of the user devices. Implementation of the commands may result in the availability of target applications being limited on the user devices. In another example, the management server can control the user devices to directly limit the availability of target applications.

At stage 426, the gateway service can transmit the message to the user device. According to an aspect of the present disclosure, the message many include a notice that identifies which applications have been limited on the user device, and the extent to which their availability has been limited. In another example, one or more of the user devices can be user owned, and one or more of the target applications can correspond to third party applications installed on the user device before enrollment with the management server. Further, enrollment with the management server could have resulted in certain features and security protocols being implemented for enterprise related uses. In one example, the message received at stage 410 and delivered to the user devices at stage 426, can specify which enterprise related features are no longer available for target applications that were available in some capacity on the user devices prior to respective enrollments.

FIG. 5 provides an illustration of exemplary system components for performing the methods of FIGS. 1-4. As shown in FIG. 4, a system 500 can implement a message exchange service 510, a gateway service 520, and an application discovery service 530, and include a management server 540. In one example, each of the message exchange, gateway, and application discovery services 510, 520, 530 can be implemented by a respective dedicated single server or dedicated network of servers that are incorporated in the system 500. In addition, the management serve 540 can include a single server or a network of servers. The management server can provide an Enterprise Mobility Management (EMM) system with which devices are enrolled. Any of the servers incorporated in the system 500 can be a computing device including one or more processors and memory storage locations.

As noted above, each of the message exchange, gateway, and application discovery services 510, 520, 530 can be implemented on its own server or own network of servers. In this example, the gateway service 520 can be implemented through a gateway server. The gateway server can be a single server or network of servers that includes one or more servers that are respectively dedicated to handling email messages, text messages, or application specific messages (e.g., enterprise implemented messaging applications such Skype for business). In the case of email, the single server or group of servers provided by the gateway server may also be referred to as a "secure email gateway" or "SEG." The SEG can receive or intercept an email message from the message exchanger service 510 and implement the gateway service 520 to parse through information in the email message.

In another example, combinations of the message exchange, gateway, and application discovery services 510, 520, 530 can be implemented on the same server or same network of servers. For example, the message exchange service 510 can be implemented on one server or networks of servers, and together, the gateway and application discovery services 520, 530 can be implemented on a different server or network of servers. In another example, servers implementing one or more of the message exchange, gateway, and application discovery services 510, 520, 530 can be part of the management server 540.

Each of the message exchange, gateway, and application discovery services 510, 520, 530 can be part of a software product that is at least partially provided by a respective server implementing one or more of these services. The software products can provide management tools and any other relevant features.

A user device 550 can be part of the system 500 as an enterprise-owned device configured to the cooperate with the management server 540. In another example, the user device 550 can be user-owned and enrolled with the management server 540, and therefore at least partially supervised or managed by the management server 540.

As illustrated in FIG. 5, the gateway service 520 communicates with the message exchange service 510 to receive messages. The gateway service 520 can create copies 521 of the messages and transmit the copies 521 to the application discovery service 530. The application discovery service 530 also receives the application configuration file 501. The application configuration file 501 can be provided by the management server 540 or from another source. For example, the application discovery service 530 can be implemented on a server that includes a software product for generating an application configuration file. An administrator can utilize the software product to communicate with the management server 540 to obtain managed application information and create the application configuration file. In another example, the administrator may directly utilize a service provided on the management server 540 to generate the application configuration file 501.

The application discovery service 530 can communicate with the management server 540 to send an ID 531 for the user device 550, receive a list of available applications 541 on the user device 550, and send trigger information 533. The management server 540 can provide the gateway service 520 with a notification of its communication with the application discovery service 530. Further, the management server 540 can provide the user device 550 with an application instruction 543 that may include content related to applications needed by the user device 550 to access all of the content in the message 511. The gateway service 520 transmits the message 511 to the user device 550 once the system 500 provides that all applications required to access all of the content in the message 511 are available to the user device 550.

FIG. 6 is an exemplary illustration of a message 600 that can be received by the user device 550. The message 600 can include content that is accessible by applications currently unavailable on the user device 550. A regex implemented by the application discovery service 530 can be configured based on the application configuration file 501 to recognize information in an XML copy of the message 600. For example, information or keywords can recognized from a sender email address 610, a subject 612, a recipient email address 614, and a device user identity 616. In one example, once parsed out by the regex, the sender email address 610 can be recognized as corresponding to a message sent from an administrator. Further, the subject 612 can include a value that is recognized by the application discovery service 530 as an instruction to either make an application available, or limit a target application's availability, on the user device 550. The recipient email address 614 or the device user identity 616 can be transmitted to the management server 540 or processed by the application discovery service 520, in order to identify the user device 550 as being associated with a destination for the message 600.

As illustrated, the message 600 may include a first text element 620 that indicates the message includes an attachment. Recognition of the first text element 620 may cause the regex applied to the copy of the message 600 to search for and analyze a file type 624 of an attachment 622. Analysis of the file type 624 can result in the regex identifying the file type as a keyword that corresponds to an ID or a keyword for an application specified in the application configuration file 501. In another example, the regex may search for and recognize attachment information without recognizing a text element that indicates the message 600 includes an attachment. Additionally, the message 600 includes a second text item 626 that reveals the type of file of the attachment or names an application that is used to access the attachment (e.g., "note file," "word file," "excel file," etc.). A name of an application may be included as a keyword for that application within the application configuration file 501.

As further illustrated in FIG. 6, the message 600 can included a link 630 that can correspond to a web address for a website or a document or other file that is stored by a cloud service. For example, the link 630 could be a ONEDRIVE, DROPBOX, GOOGLE DRIVE, or other cloud service link for which the regex can recognize the cloud service. Types of cloud service links, or names of cloud services that may be included in address associated with the link, may be included in the application configuration file 501 as keywords for an enterprise managed web browser. Thus, identification of a name associated with a type of cloud service link, or the name of the cloud service, as a keyword can result in the application discovery service 530 identifying the enterprise managed web browser as an application that is required to access the content in the message 600 that is associated with the link 630.

The message 600 can include a third text element 632 that indicates the message includes a website address or link. Recognition of the third text element 632 may cause the regex applied to the copy of the message 600 to search for and analyze any link 634 included in a body of the message 600. In another example, the regex may search for and recognize website addresses without recognizing a separate text element that indicates there is a website address in the message 600. In one example, an application specified in the application configuration file 501 can be a particular enterprise managed web browser. Keywords in the application configuration file can include domain names for websites that an enterprise requires, through the management server 540, only be accessed with the enterprise managed web browser. Thus, identification of the domains as keywords will result in the application discovery service 530 identifying the enterprise managed web browser as an application that is required to access the content in the message 600.

The message 600 also includes a fourth text element 640 that corresponds to an enterprise application specified in the application configuration file 501 via a respective application ID or respective keywords. Applying the regex to the copy of the message 600 result in the fourth text element 640 being recognized and the enterprise application being identified as an application required to access a corresponding portion of content in the message 600. Absent the fourth text element 640, the enterprise application may be identified through the application of regex due to the presence of a fifth text element 642 and information associated with an icon 644 related to the fifth text element. In another example, the regex may search for and recognize application initiating icons without recognizing a text element that indicates an icon is included in the message 600.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented is only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for discovering a need for and managing an availability of applications installed on a device based on email message content, comprising:
   receiving an email message at an application discovery server, prior to the email message being sent to the device;
   identifying, at the application discovery server, a required application for accessing content of the email message, including:
      generating a regex that includes keywords associated with a list of applications managed by a management server, wherein the device is enrolled with the management server; and
      matching keywords from the regex to characters in the email message;
      using at least one matched keyword to identify the required application;
   determining, by the management server, that the required application is not available on the device that will receive the email message; and
   installing the required application on the device prior to the device receiving the message, wherein the management server sends an installation instruction to a management agent that executes on the device and wherein the management agent provides information on the device to the management server.

2. The method of claim 1, further comprising:
   generating trigger information based on an identity of the required application;
   generating an application instruction based on the trigger information and a status of the device as one or more devices enrolled with the management server; and
   transmitting the application instruction to the device.

3. The method of claim 2, wherein generating the application instruction includes generating content that is automatically installed on the device, and wherein the status defines the device as being controlled by the management server.

4. The method of claim 2, wherein generating the application instruction includes causing the device to generate a prompt requesting user authorization to make the required application available.

5. The method of claim 4, wherein the status defines the device as being one of supervised and managed by the management server.

6. The method of claim 1, further comprising:
   generating an application configuration file according to the list of applications managed by the management server;
   generating the regex according to the application configuration file; and
   applying the regex to a copy of the email message, wherein the copy of the email message is received at the application discovery server from a gateway server, the gateway server sending the email message to the device.

7. The method of claim 1, further comprising:
   receiving, and identifying keywords in, an other email message;
   determining a limit instruction and an identity of a specified application based on the keywords; and
   causing an availability of the specified application to be limited in accordance with the limit instruction.

8. A non-transitory, computer-readable medium comprising instructions that, when executed by a processor, perform stages for discovering a need for and managing an availability of applications based on message content, the stages comprising:
   receiving an email message at an application discovery server, prior to the email message being sent to the device;

identifying, at the application discovery server, a required application for accessing content of the email message, including:
  generating a regex that includes keywords associated with a list of applications managed by a management server, wherein the device is enrolled with the management server; and
  matching keywords from the regex to characters in the email message;
  using at least one matched keyword to identify the required application;
determining, by the management server, that the required application is not available on the device that will receive the email message; and
installing the required application on the device prior to the device receiving the message, wherein the management server sends an installation instruction to a management agent that executes on the device and wherein the management agent provides information on the device to the management server.

9. The non-transitory, computer-readable medium of claim 8, the stages further comprising:
  generating trigger information based on an identity of the required application;
  generating an application instruction based on the trigger information and a status of the device as one or more devices enrolled with the management server; and
  transmitting the application instruction to the device.

10. The non-transitory, computer-readable medium of claim 9, wherein generating the application instruction includes generating content that is automatically installed on the device, and wherein the status defines the device as being controlled by the management server.

11. The non-transitory, computer-readable medium of claim 9, wherein generating the application instruction includes causing the device to generate a prompt requesting user authorization to make the required application available.

12. The non-transitory, computer-readable medium of claim 11, wherein the status defines the device as being one of supervised and managed by the management server.

13. The non-transitory, computer-readable medium of claim 8, the stages further comprising:
  generating an application configuration file according to the list of applications managed by the management server;
  generating the regex according to the application configuration file; and
  applying the regex to a copy of the email message, wherein the copy of the email message is received at the application discovery server from a gateway server, the gateway server sending the email message to the device.

14. The non-transitory, computer-readable medium of claim 8, the stages further comprising:
  receiving, and identifying keywords in, an other email message;
  determining a limit instruction and an identity of a specified application based on the keywords; and
  causing an availability of the specified application to be limited in accordance with the limit instruction.

15. A system for discovering a need for and managing an availability of applications based on message content, the system comprising:
  a memory storage including a non-transitory, computer-readable medium comprising instructions; and
  a computing device including a processor that executes the instructions to carry out stages comprising:
    receiving an email message at an application discovery server, prior to the email message being sent to the device;
    identifying, by the application discovery server, a required application for accessing content of the email message, including:
      generating a regex that includes keywords associated with a list of applications managed by a management server, wherein the device is enrolled with the management server; and
      matching keywords from the regex to characters in the email message;
      using at least one matched keyword to identify the required application;
    determining that the required application is not available on the device that will receive the email message; and
    installing the required application on the device prior to the device receiving the message, wherein the management server sends an installation instruction to a management agent that executes on the device and wherein the management agent provides information on the device to the management server.

16. The system of claim 15, the stages further comprising:
  generating trigger information based on an identity of the required application;
  generating an application instruction based on the trigger information and a status of the device as one or more devices enrolled with the management server; and
  transmitting the application instruction to the device.

17. The system of claim 16, wherein generating the application instruction includes generating content that is automatically installed on the device, and wherein the status defines the device as being controlled by the management server.

18. The system of claim 16, wherein generating the application instruction includes causing the device to generate a prompt requesting user authorization to make the required application available.

19. The system of claim 15, the stages further comprising:
  generating an application configuration file according to the list of applications managed by the management server;
  generating the regex according to the application configuration file; and
  applying the regex to a copy of the email message, wherein the copy of the email message is received at the application discovery server from a gateway server, the gateway server sending the email message to the device.

20. The system of claim 15, the stages further comprising:
  receiving, and identifying keywords in, an other email message;
  determining a limit instruction and an identity of a specified application based on the keywords; and
  causing an availability of the specified application to be limited in accordance with the limit instruction.

* * * * *